United States Patent
Yeo et al.

(10) Patent No.: US 11,323,229 B2
(45) Date of Patent: May 3, 2022

(54) METHOD AND DEVICE FOR DETERMINING UPLINK DATA AND CONTROL SIGNAL TRANSMISSION TIMING IN WIRELESS COMMUNICATION SYSTEM

(71) Applicant: Samsung Electronics Co., Ltd., Gyeonggi-do (KR)

(72) Inventors: Jeongho Yeo, Gyeonggi-do (KR); Jinyoung Oh, Seoul (KR); Heedon Gha, Gyeonggi-do (KR); Taehan Bae, Seoul (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/928,539

(22) Filed: Jul. 14, 2020

(65) Prior Publication Data

US 2020/0344029 A1   Oct. 29, 2020

Related U.S. Application Data

(63) Continuation of application No. 16/301,246, filed as application No. PCT/KR2017/004797 on May 10, 2017, now Pat. No. 10,735,171.

(30) Foreign Application Priority Data

May 13, 2016 (KR) .......................... 10-2016-0058890

(51) Int. Cl.
*H04L 5/00* (2006.01)
*H04L 1/18* (2006.01)
(Continued)

(52) U.S. Cl.
CPC .............. *H04L 5/0055* (2013.01); *H04L 1/00* (2013.01); *H04L 1/1812* (2013.01);
(Continued)

(58) Field of Classification Search
CPC ....... H04L 5/0055; H04L 1/1887; H04L 1/00; H04L 1/1854; H04L 5/00; H04L 1/1812;
(Continued)

(56) References Cited

U.S. PATENT DOCUMENTS

2010/0074246 A1   3/2010   Harada et al.
2010/0211845 A1   8/2010   Lee
(Continued)

FOREIGN PATENT DOCUMENTS

KR   1020080003682   1/2008
KR   1020090119982   11/2009
(Continued)

OTHER PUBLICATIONS

PCT/ISA/210 Search Report dated Nov. 8, 2017 issued on PCT/KR2017/004797 (pp. 5).
(Continued)

*Primary Examiner* — Yaotang Wang
(74) *Attorney, Agent, or Firm* — The Farrell Law Firm, P.C.

(57) ABSTRACT

Methods and apparatuses are provided in which a radio resource control (RRC) message is transmitted to a terminal. A set of values for a timing between a physical downlink shared channel (PDSCH) and acknowledgement information is included in the RRC message, and the set of values is respectively associated with a set of numbers of a transmission time interval (TTI). First downlink control information (DCI) for a first PDSCH is transmitted to the terminal. A number of bits associated with one value in the set of values is included in the DCI. The first PDSCH is transmitted to the terminal. Acknowledgement information for the first PDSCH is received from the terminal, based on a transmission timing determined by using the RRC message and the number of bits in the DCI.

20 Claims, 19 Drawing Sheets

(51) Int. Cl.
*H04W 72/12* (2009.01)
*H04L 1/00* (2006.01)

(52) U.S. Cl.
CPC .......... *H04L 1/1854* (2013.01); *H04L 1/1887* (2013.01); *H04L 1/1896* (2013.01); *H04L 5/00* (2013.01); *H04W 72/1268* (2013.01); *H04W 72/1289* (2013.01)

(58) Field of Classification Search
CPC ... H04L 1/1896; H04L 5/0053; H04L 5/0078; H04L 5/0001; H04L 1/0047; H04W 72/1268; H04W 72/1289
See application file for complete search history.

(56) References Cited

U.S. PATENT DOCUMENTS

| | | | |
|---|---|---|---|
| 2012/0243497 A1* | 9/2012 | Chung | H04L 1/1861 370/329 |
| 2013/0250864 A1 | 9/2013 | Zhang | |
| 2013/0343357 A1 | 12/2013 | Lindoff et al. | |
| 2014/0286255 A1 | 9/2014 | Nam et al. | |
| 2014/0307567 A1 | 10/2014 | Li et al. | |
| 2016/0094315 A1 | 3/2016 | Noh et al. | |
| 2016/0212744 A1 | 7/2016 | Lyu | |
| 2018/0145796 A1* | 5/2018 | Liang | H04L 1/1861 |
| 2018/0175974 A1* | 6/2018 | Wu | H04L 1/1685 |
| 2018/0234213 A1* | 8/2018 | Han | H04L 1/1607 |
| 2019/0109692 A1* | 4/2019 | Gao | H04L 5/0091 |
| 2019/0289586 A1 | 9/2019 | Ouchi et al. | |

FOREIGN PATENT DOCUMENTS

| | | |
|---|---|---|
| KR | 1020140009350 | 1/2014 |
| KR | 1020150140629 | 12/2015 |
| WO | WO 2016/040290 | 3/2016 |

OTHER PUBLICATIONS

PCT/ISA/237 Written Opinion dated Nov. 8, 2017 issued on PCT/KR2017/004797 (pp. 5).
Huawei, HiSilicon, 3GPP TSG RAN WG1 Meeting #84bis, R1-162115, Busan, Korea Apr. 11-15, 2016, Short TTI for UL transmissions, pp. 6.
Intel Corporation, "DL Gaps and Remaining Details of Timing Relationships for NB-IoT", R1-162973, 3GPP TSG RAN WG1 Meeting #84bis, Apr. 11-15, 2016, 7 pages.
LG Electronics, "Discussion on Frame Structure for NR", R1-162519, 3GPP TSG RAN WG1 Meeting #84bis, Apr. 11-15, 2016, 6 pages.
European Search Report dated Mar. 1, 2019 issued in counterpart application No. 17796359.2-1219, 8 pages.
Ericsson, "Definition of DCI Bit Fields for Short TTI", R1-163323, 3GPP TSG RAN WG1 Meeting #84bis, Apr. 11-15, 2016, 5 pages.
Ericsson, "On Processing Time Reduction and Related Procedures", R1-163326, 3GPP TSG RAN WG1 Meeting #84 bis, Apr. 11-15, 2016, 6 pages.
European Search Report dated May 28, 2021 issued in counterpart application No. 17796359.2-1205, 7 pages.
European Search Report dated Aug. 5, 2021 issued in counterpart application No. 21183179.7-1205, 11 pages.
Chinese Office Action dated Oct. 11, 2021 issued in counterpart application No. 201780029664.2, 12 pages.
U.S. Office Action dated Mar. 4, 2022 issued in counterpart application No. 17/069,377, 11 pages.

* cited by examiner

METHOD AND DEVICE FOR DETERMINING UPLINK DATA AND CONTROL SIGNAL TRANSMISSION TIMING IN WIRELESS COMMUNICATION SYSTEM

PRIORITY

This application is a Continuation Application of U.S. application Ser. No. 16/301,246, filed in the U.S. Patent and Trademark Office on Nov. 13, 2018, which is a National Phase Entry of PCT International Application No. PCT/KR2017/004797, filed on May 10, 2017, and claims priority to Korean Patent Application No. 10-2016-0058890, filed in the Korean Intellectual Property Office on May 13, 2016, the content of each of which is incorporated herein by reference.

BACKGROUND

1. Field

The present invention relates to a wireless communication system and, in particular, to a method and apparatus for uplink data and control signal transmission timings.

2. Description of Related Art

In order to meet the increasing demand for wireless data traffic since the commercialization of $4^{th}$ generation (4G) communication systems, the development focus is on the $5^{th}$ generation (5G) or pre-5G communication system. For this reason, the 5G or pre-5G communication system is called a beyond 4G network communication system or post long-term evolution (LTE) system. Implementation of the 5G communication system in millimeter wave (mmWave) frequency bands (e.g., 60 GHz bands) is being considered to accomplish higher data rates. In order to increase the propagation distance by mitigating propagation loss in the 5G communication system, discussions are underway about various techniques such as beamforming, massive multiple-input multiple output (MIMO), full dimensional MIMO (FD-MIMO), array antenna, analog beamforming, and large-scale antenna. Also, in order to enhance network performance of the 5G communication system, developments are underway of various techniques such as evolved small cell, advanced small cell, cloud radio access network (RAN), ultra-dense network, device-to-device (D2D) communication, wireless backhaul, moving network, cooperative communication, coordinated multi-points (CoMP), and interference cancellation. Furthermore, the ongoing research includes the use of hybrid frequency shift keying (FSK) and quadrature amplitude modulation (QAM) {FQAM} and sliding window superposition coding (SWSC) as advanced coding modulation (ACM), filter bank multi-carrier (FBMC), non-orthogonal multiple access (NOMA), and sparse code multiple access (SCMA).

Meanwhile, the Internet is evolving from a human-centric communication network in which information is generated and consumed by humans to the Internet of things (IoT) in which distributed things or components exchange and process information. The combination of the cloud server-based Big data processing technology and the IoT begets Internet of everything (IoE) technology. In order to secure the sensing technology, wired/wireless communication and network infrastructure, service interface technology, and security technology required for implementing the IoT, recent research has focused on sensor network, machine-to-machine (M2M), and machine-type communication (MTC) technologies. In the IoT environment, it is possible to provide an intelligent Internet Technology that is capable of collecting and analyzing data generated from connected things to create new values for human life. The IoT can be applied to various fields such as smart home, smart building, smart city, smart car or connected car, smart grid, health care, smart appliance, and smart medical service through legacy information technology (IT) and convergence of various industries.

Thus, there are various attempts to apply the IoT to the 5G communication system. For example, the sensor network, M2M, and MTC technologies are implemented by means of the 5G communication technologies such as beamforming, MIMO, and array antenna. The application of the aforementioned cloud RAN as a big data processing technology is an example of convergence between the 5G and IoT technologies.

Meanwhile, it is important to determining uplink data and control signal transmission timings appropriately in a wireless communication system where there is signal transmission delay caused by a physical distance between a base station and a terminal.

In order for a wireless communication system to support a communication distance of up to 100 km between a base station and a terminal, it is necessary to transmit a signal about 0.67 ms earlier than the reception timing determined in view of the terminal. This aims to achieve synchronization of reception timings of the signals transmitted by multiple terminals at the base station, and the corresponding technique is called timing advance (TA).

In an LTE system supporting a transmission time interval (TTI) of 1 ms, a terminal transmits physical uplink shared channel (PUSCH) about 4 ms after receipt of an uplink grant from a base station. The terminal also transmits an uplink control signal conveying a hybrid automatic repeat request (HARQ) acknowledgement (ACK) or negative ACK (HACK) corresponding to a physical downlink shared channel (PDSCH) received from the base station on a physical uplink control channel (PUCCH) or PUSCH abut after 4 ms upon receipt of the PDSCH. In the LTE system, a processing time for a terminal to process the received signal and prepare for transmitting an uplink signal is calculated by subtracting a TA value form about 3 ms, and it may become at least about 2.33 ms in consideration of the maximum TA.

However, this approach may bring about some problems, when the TTI length is too short or multiple TTI lengths are in use, in that determining the timing of transmitting uplink data based on the receipt of an uplink grant and the timing of transmitting a uplink control channel conveying the HARQ ACK/NACK based on the receipt of corresponding downlink data is inefficient and, in worst case, the terminal may not perform uplink transmission to the base station in a given time depending on the TA length. The present invention has been conceived to solve this problem and aims to provide a method for determining suitable uplink data and control signal transmission timings.

SUMMARY

In accordance with an aspect of the present invention, a method performed by a base station in a wireless communication system is provided. A radio resource control (RRC) message is transmitted to a terminal. A set of values for a timing between a PDSCH and acknowledgement information is included in the RRC message, and the set of values is respectively associated with a set of numbers of a TTI.

First downlink control information (DCI) for a first PDSCH is transmitted to the terminal. A number of bits associated with one value in the set of values is included in the DCI. The first PDSCH is transmitted to the terminal. Acknowledgement information for the first PDSCH is received from the terminal, based on a transmission timing determined by using the RRC message and the number of bits in the DCI.

In accordance with another aspect of the present invention, a method performed by a terminal in a wireless communication system is provided. An RRC message is received from a base station. A set of values for a timing between a PDSCH and acknowledgement information is included in the RRC message, and the set of values is respectively associated with a set of numbers of a TTI. First DCI for a first PDSCH is received from the base station. A number of bits associated with one value in the set of values is included in the DCI. The first PDSCH is received from the base station. Acknowledgement information for the first PDSCH is transmitted to the base station, based on a transmission timing determined by using the RRC message and the number of bits in the DCI.

In accordance with another aspect of the present invention, a base station in a wireless communication system is provided. The base station includes a transceiver and a controller coupled with the transceiver. The controller is configured to: transmit, to a terminal, an RRC message, wherein a set of values for a timing between a PDSCH and acknowledgement information is included in the RRC message, and the set of values is respectively associated with a set of numbers of a TTI; transmit, to the terminal, first downlink control information (DCI) for a first PDSCH, wherein a number of bits associated with one value in the set of values is included in the DCI; transmit, to the terminal, the first PDSCH; and receive, from the terminal, acknowledgement information for the first PDSCH, based on a transmission timing determined by using the RRC message and the number of bits in the DCI.

In accordance with still another aspect of the present invention, a terminal in a wireless communication system is provided. The terminal includes a transceiver and a controller coupled with the transceiver. The controller is configured to: receive, from a base station, an RRC message, wherein a set of values for a timing between a PDSCH and acknowledgement information is included in the RRC message, and the set of values is respectively associated with a set of numbers of a TTI; receive, from the base station, first DCI for a first PDSCH, wherein a number of bits associated with one value in the set of values is included in the DCI; receive, from the base station, the first PDSCH; and transmit, to the base station, acknowledgement information for the first PDSCH, based on a transmission timing determined by using the RRC message and the number of bits in the DCI.

The uplink data and control signal transmission timing determination method of the present invention is advantageous in terms of reducing transmission delay and improving frequency-time resource utilization efficiency.

DETAILED DESCRIPTION

Figure 1:
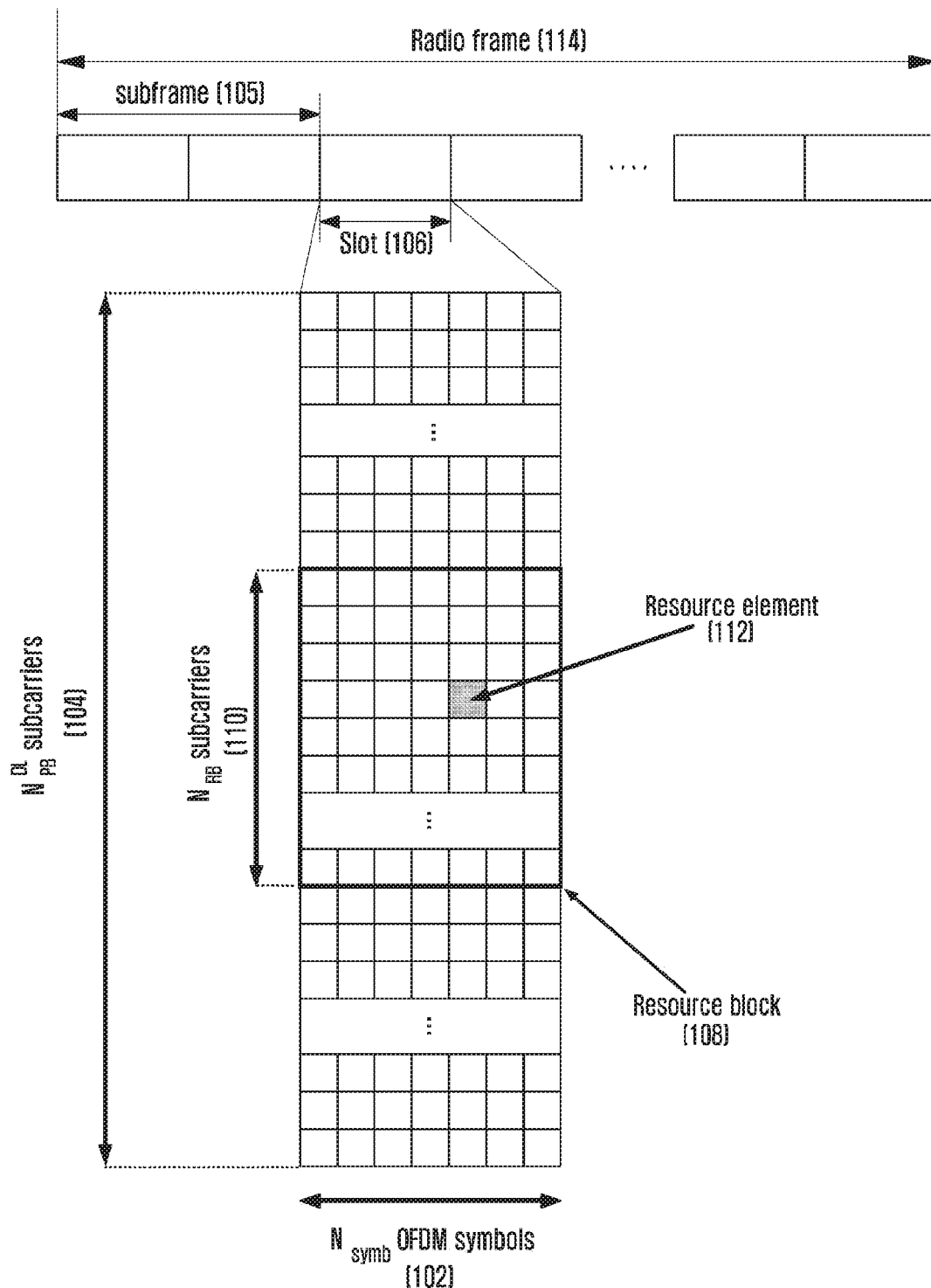
FIG. 1 is a diagram illustrating a downlink time-frequency resource structure of an LTE or LTE-A system.

Exemplary embodiments of the present invention are described in detail with reference to the accompanying drawings. The same reference numbers are used throughout the drawings to refer to the same or like parts. Detailed description of well-known functions and structures incorporated herein may be omitted to avoid obscuring the subject matter of the present invention.

Although the description is directed to an advanced EUTRA (or LTE-A) system supporting carrier aggregation, it will be understood by those skilled in the art that the present invention can be applied even to other communication systems having a similar technical background and channel format, with a slight modification, without departing from the spirit and scope of the present invention. For example, the subject matter of the present invention can be applied to a multicarrier HSPA supporting the carrier aggregation.

Detailed description of technical specifications well-known in the art and unrelated directly to the present invention may be omitted to avoid obscuring the subject matter of the present invention. This aims to omit unnecessary description so as to make clear the subject matter of the present invention.

For the same reason, some elements are exaggerated, omitted, or simplified in the drawings and, in practice, the elements may have sizes and/or shapes different from those shown in the drawings. Throughout the drawings, the same or equivalent parts are indicated by the same reference numbers.

Advantages and features of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this invention will be thorough and complete and will fully convey the concept of the invention to those skilled in the art, and the present invention will only be defined by the appended claims. Like reference numerals refer to like elements throughout the specification.

It will be understood that each block of the flowcharts and/or block diagrams, and combinations of blocks in the flowcharts and/or block diagrams, can be implemented by computer program instructions. These computer program instructions may be provided to a processor of a general-purpose computer, special purpose computer, or other programmable data processing apparatus, such that the instructions that are executed via the processor of the computer or other programmable data processing apparatus create means for implementing the functions/acts specified in the flowcharts and/or block diagrams. These computer program instructions may also be stored in a non-transitory computer-readable memory that can direct a computer or other programmable data processing apparatus to function in a particular manner, such that the instructions stored in the non-transitory computer-readable memory produce articles of manufacture embedding instruction means that implement the function/act specified in the flowcharts and/or block diagrams. The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions/acts specified in the flowcharts and/or block diagrams.

Furthermore, the respective block diagrams may illustrate parts of modules, segments, or codes including at least one or more executable instructions for performing specific logic function(s). Moreover, it should be noted that the functions of the blocks may be performed in a different order in several modifications. For example, two successive blocks may be performed substantially at the same time, or may be performed in reverse order according to their functions.

According to various embodiments of the present invention, the term "module", means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionalities of the components and modules may be combined into fewer components and modules or further separated into more components and modules. In addition, the components and modules may be implemented such that they execute one or more CPUs in a device or a secure multimedia card. The mobile communication system has evolved to a high-speed, high-quality packet data communication system (such as High Speed Packet Access (HSPA), LTE (or evolved universal terrestrial radio access (E-UTRA)), and LTE-Advanced (LTE-A) defined in $3^{rd}$ Generation Partnership Project (3GPP), High Rate Packet Data (HRPD) defined in $3^{rd}$ Generation Partnership Project-2 (3GPP2), and 802.16e defined in IEEE) capable of providing data and multimedia services beyond the early voice-oriented services. More recently, the standardization for the $5^{th}$ generation wireless communication systems is in progress under the name of 5G or new radio (NR).

The LTE system as one of the representative broadband wireless communication systems uses orthogonal frequency division multiplexing (OFDM) in the downlink and single carrier frequency division multiple access (SC-FDMA) in the uplink. The term "uplink" denotes the radio transmission path from a terminal which is interchangeably referred to as user equipment (UE) and mobile station (MS) to a base station (BS) which is interchangeably referred to as evolved node B (eNB), and the term "downlink" denotes the radio transmission path from a base station to a terminal. Such multiple access schemes are characterized by allocating the time-frequency resources for transmitting user-specific data and control information without overlap each other, i.e., maintaining orthogonality, so as to distinguish among user-specific data and control information.

The LTE system adopts a Hybrid Automatic Repeat Request (HARQ) scheme for physical layer retransmission when decoding failure occurs in initial data transmission. HARQ scheme is designed to operate in such a way that a receiver which fails in decoding data sends a transmitter a negative acknowledgement (NACK) indicative of decoding failure in order for the transmitter to retransmit the corresponding data on the physical layer. The receiver combines the retransmitted data with the decoding-failed data to improve data reception performance. It may also be possible for the receiver to send the transmitter an Acknowledgement (ACK) indicative of successful decoding, when the data are decoded successfully, in order for the transmitter to transmit new data.

FIG. 1 is a diagram illustrating a basic time-frequency resource structure for transmitting downlink data or control channels in an LTE system.

In FIG. 1, the horizontal axis denotes the time, and the vertical axis denotes the frequency. The smallest transmission unit in the time domain is an OFDM symbol, and $N_{symb}$ OFDM symbols 102 forms a slot 106, and 2 slots forms a subframe 105. Each slot spans 0.5 ms, and each subframe spans 1.0 ms. A radio frame 114 is a time unit consisted of 10 subframes. In the frequency domain, the smallest transmission unit is a subcarrier, and the total system transmission bandwidth consists of $N_{BW}$ subcarriers 104.

In the time-frequency resource structure, the basic resource unit is a Resource Element (RE) indicated by an OFDM symbol index and a subcarrier index. A Resource Block (RB) (or Physical Resource Block (PRB) 108 is defined by $N_{symb}$ consecutive OFDM symbols 102 in the time domain and $N_{RB}$ consecutive subcarriers 110 in the frequency domain. That is, one RB 108 consists of $N_{symb} \times N_{RB}$ REs 112. Typically, the RB is the smallest data transmission unit. In the LTE system, $N_{symb}=7$, $N_{RB}=12$, and $N_{RB}^{DL}$ is proportional to the system transmission bandwidth. The data rate increased in proportion to the number of RBs scheduled to the terminal. For the LTE system, 6 transmission bandwidths are defined. In the case of an FDD system in which downlink and uplink are separated in frequency, the downlink transmission bandwidth and uplink transmission bandwidth may differ from each other. The channel bandwidth denotes an RF bandwidth in comparison with the system transmission bandwidth. Table 1 shows the relationship between the system transmission bandwidth and channel bandwidth defined in the LTE standard. For example, an LTE system having 10 MHz channel bandwidth uses the transmission bandwidth of 50 RBs.

TABLE 1

| Channel bandwidth $BW_{Channel}$ [MHz] | 1.4 | 3 | 5 | 10 | 15 | 20 |
|---|---|---|---|---|---|---|
| Transmission bandwidth configuration $N_{RB}$ | 6 | 15 | 25 | 50 | 75 | 100 |

The downlink control information is transmitted in N OFDM symbols at the beginning of the subframe. Typically, $N=\{1, 2, 3\}$. Accordingly, N value varies at every subframe depending on the control information amount to be transmitted. The control information includes a control channel transmission period indicator for indicating a number of OFDM symbols for conveying the control information, scheduling information for downlink or uplink data transmission, and an HARQ ACK/NACK signal.

In the LTE system, the downlink or uplink data scheduling information is transmitted from the base station to the terminal using Downlink Control Information (DCI). The DCI is categorized into different DCI formats depending on the purpose, e.g., indicating UL grant for UL data scheduling or DL grant for DL data scheduling, indicating usage for control information that is small in size, indicating whether multiple antenna-based spatial multiplexing is applied, and indicating usage for power control. For example, the DCI format 1 for DL grant is configured to include at least the following information.

Resource allocation type 0/1 flag: Resource allocation type 0/1 flag indicates whether the resource allocation scheme is Type 0 or Type 1. A Type-0 is to allocate resources in units of Resource Block Group (RBG) by applying a bitmap scheme. In the LTE system, the basic unit of scheduling may be a Resource Block (RB) that is expressed by time-frequency domain resources, and the RBG may include multiple RBs and may be the basic unit of scheduling in the Type-0 scheme. A Type-1 is to allocate a particular RB in an RBG.

Resource block assignment: Resource block assignment indicates an RB allocated for data transmission. The resources may be determined depending on the system bandwidth and the resource allocation scheme.

Modulation and coding scheme (MCS): MCS indicates a modulation scheme used for data transmission and a size of a transport block to be transmitted.

HARQ process number: HARQ process number indicates a process number of HARQ

New data indicator: New data indicator indicates whether the HARQ transmission is an initial transmission or a retransmission.

Redundancy version: Redundancy version indicates a redundancy version of HARQ.

TPC command for PUCCH: Transmit Power Control (TPC) command for Physical Uplink Control Channel (PUCCH) indicates a power control command for a PUCCH that is an uplink control channel.

The DCI may be transmitted over a Physical Downlink Control Channel (PDCCH) (hereinafter, interchangeably referred to as control information) or Enhanced PDCCH (EPDCCH) (hereinafter, interchangeably referred to as enhanced control information) after undergoing a channel coding and modulation process.

Typically, the DCI may undergo channel coding for each terminal independently, and then the channel-coded DCI may be configured with its dependent PDCCH and transmitted. In the time domain, a PDCCH may be mapped and transmitted during the control channel transmission period. The frequency-domain mapping location of the PDCCH may be determined by an ID of each terminal, and it may be spread throughout the entire system transmission band.

Downlink data may be transmitted over a Physical Downlink Shared Channel (PDSCH) that is a physical channel for downlink data transmission. A PDSCH may be transmitted after the control channel transmission period, and the scheduling information such as the detailed mapping location in the frequency domain and the modulation scheme may be indicated by the DCI that is transmitted over the PDCCH.

Using a 5-bit MCS in the control information constituting the DCI, the base station notifies the terminal of the modulation scheme applied to the PDSCH to be transmitted and the size of data (e.g., Transport Block Size (TBS)) to be transmitted. The TBS corresponds to the size given before channel coding for error correction is applied to the data (e.g., Transport Block (TB)) to be transmitted by the base station.

The modulation schemes supported by the LTE system may include Quadrature Phase Shift Keying (QPSK), 16 Quadrature Amplitude Modulation (QAM), and 64QAM, and they have modulation orders ($Q_m$) 2, 4, and 6, respectively. That is, the QPSK modulation transmits 2 bits per symbol, the 16QAM transmits 4 bits per symbol, and the 64QAM transmits 6 bits per symbol.

Figure 2:
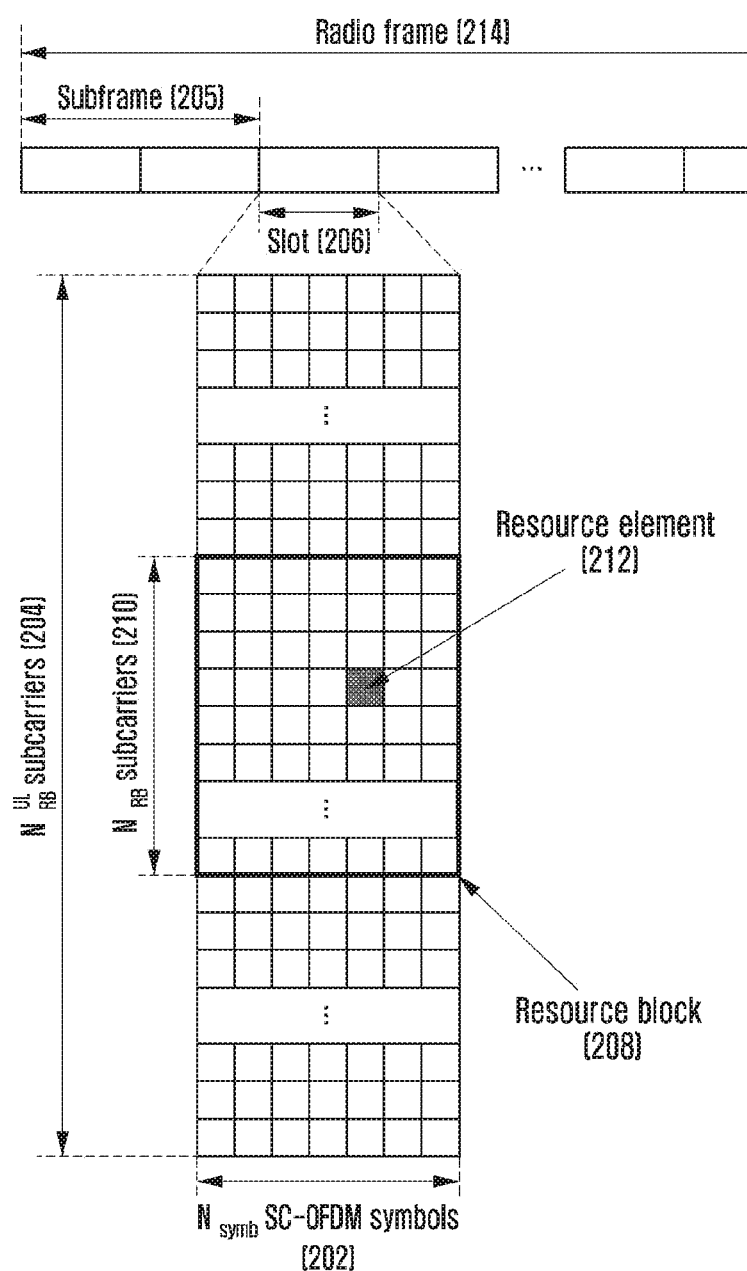
FIG. 2 is a diagram illustrating an uplink time-frequency resource structure of an LTE or LTE-A system.

FIG. 2 is a diagram illustrating a basic time-frequency resource structure for transmitting uplink data or control channels in an LTE-A system.

In FIG. 2, the horizontal axis denotes the time, and the vertical axis denotes the frequency. The smallest transmission unit in the time domain is SC-FDMA symbol, and, $N_{symb}$ SC-FDMA symbols 202 form a slot 206. Two slots form a subframe 205. The smallest transmission unit in the frequency domain is subcarrier, and the total system transmission bandwidth consists of $N_{RB}^{UL}$ subcarriers 204. $N_{RB}^{UL}$ is proportional with the system transmission bandwidth.

In the time-frequency domain, the basic resource unit is RE 212, and each RE is defined by one SC-FDMA symbol index and one subcarrier index. An RB or PRB 208 is defined by $N_{symb}$ consecutive SC-FDMA symbols in the time domain and $N_{RB}$ consecutive subcarriers in the frequency domains. Accordingly, one RB consists of $N_{symb} \times N_{RB}$ REs. Typically, the smallest data or control information transmission unit is RB. A physical uplink control channel (PUCCH) is mapped to a frequency region corresponding to one RB and transmitted during a time period of one subframe.

The LTE standard defines a relationship between the PDSCH or the PDCCH or EPDCCH carrying a semi-persistent scheduling (SPS) release and the PUCCH or PUSCH carrying the HARQ ACK/NACK corresponding to the PDSCH, PDCCH, or EPDCCH. For example, in an LTE system operating in the FDD mode, the HARQ ACK/NACK corresponding to the PDSCH or the PDCCH or EPDCCH carrying the SPS release, the PDSCH or the PDCCH or EPDCCH being transmitted at the $(n-4)^{th}$ subframe, is carried in the PUCCH or PUSCH being transmitted at the $n^{th}$ subframe.

The LTE employs an asynchronous HARQ scheme for DL HARQ. That is, if an eNB receives an HARQ NACK for initially transmitted data from a UE, it may freely determine a retransmission timing through a scheduling operation. If the UE fails to decode the received data, it stores the erroneous initial data and combines the buffered data with the retransmitted data.

If the UE receives a PDSCH carrying the DL data transmitted by the eNB at the $n_{th}$ subframe, it transmits UL control information including the HARQ ACK/NACK corresponding to the DL data to the eNB through the PUCCH or PUSCH at $(n+k)^{th}$ subframe. Here, k is determined differently depending on the duplex mode (i.e., FDD or time division duplex (TDD)) and subframe configuration in use by the LTE system. For example, k is fixed to 4 in the FDD LTE system. Whereas, k is variable according to the subframe configuration and subframe index in the TDD LTE system.

Unlike the DL HARQ, the LTE employs a synchronous HARQ scheme with a fixed data transmission timing. That is, the UL-DL timing relationship between the PUSCH and PDCCH that is followed by the PUSCH and a physical hybrid indicator channel (PHICH) carrying the DL HARQ ACK/NACK corresponding to the PUSCH is fixed according to a rule as follows.

If the UE receive a PDCCH carrying UL scheduling control information or a PHICH carrying a DL HARQ ACK/NACK from the eNB at $n^{th}$ subframe, it transmits UL data through a PUSCH at the $(n+k)^{th}$ subframe based on the control information. Here, k is determined differently depending on the duplex mode in use, i.e., FDD or TDD; and, in TDD, the TTD subframe configuration. For example, k is fixed to 4 in the FDD LTE system. Whereas, k is variable according to the subframe configuration and subframe index in the TDD LTE system.

The UE receives the PHICH carrying the DL HARQ ACK/NACK from the eNB at the $i^{th}$ subframe and the DL HARQ ACK/NACK corresponding to the PUSCH transmitted by the UE at the $(i+k)^{th}$ subframe. Here, k is determined differently depending of the duplex mode (i.e., FDD or time division duplex (TDD) and its configuration in use by the LTE system. For example, k is fixed to 4 in the FDD LTE system. Whereas, k is variable according to the subframe configuration and subframe index in the TDD LTE system.

Figure 3:
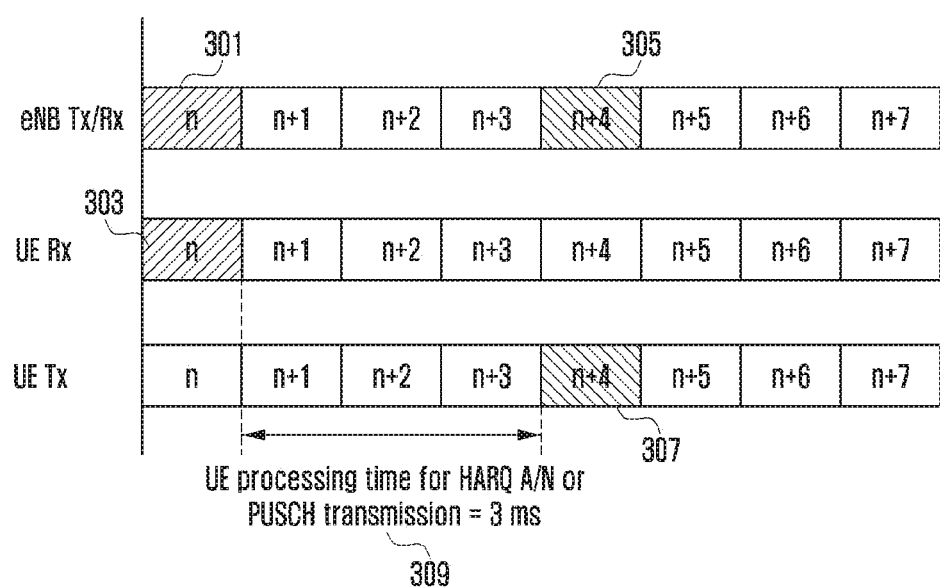
FIG. 3 is a diagram illustrating first and second signal transmission and reception timings of an eNB and a UE in an LTE or LTE-A system under the assumption that a transmission delay is 0.

FIG. 3 is a diagram illustrating transmission timings of an eNB and a UE in an FDD LTE system in which the UE transmits UL data based on a UL grant received from the eNB and an HARQ ACK/NACK corresponding to the UL data.

If the eNB transmits a UL grant or a DL control signal and data to the UE at the $n^{th}$ subframe 301, the UE receives the UL grant or the DL control signal and data at the $n^{th}$ subframe 303.

If the UE receives a UL grant at the $n^{th}$ subframe by way of example, it transmits uplink data at the $(n+4)^{th}$ subframe 307.

If the UE receives a DL control signal and data at the $n^{th}$ subframe by way of example, it transmits an HARQ ACK/NACK corresponding to the DL data at the $(n+4)^{th}$ subframe 307. In this case, a time period given for the UE to prepare UL data transmission scheduled via the UL grant or transmission of HARQ ACK/NACK corresponding to the DL data becomes 3 ms which is equal to the duration of three subframes as denoted by reference number 309.

Typically, an eNB receives the signal transmitted by a UE with a propagation delay, which is determined depending on the distance between the UE and the eNB. The propagation delay may be thought of as a value obtained by dividing the propagation path from the UE to the eNB by the speed of light. For example, if the UE is located at a distance of 100 km away from the eNB, the eNB receives the signal transmitted by the UE after about 0.34 msec. Likewise, the UE receives the signal transmitted by the eNB after about 0.34 msec.

As aforementioned, the arrival time of the signal transmitted by the UE may vary depending on the distance between the UE and the eNB. Accordingly, although multiple UEs located a different distances transmit signals simultaneously, the signals may arrive at the eNB at a different timing. In order to overcome this phenomenon, i.e., in order to make it possible for the signals transmitted by multiple UEs to arrive at the eNB at the same timing, it may be necessary to differentiate the transmission timings of the terminals according to their locations, and this technique is called timing advance (TA) in LTE.

Figure 4:
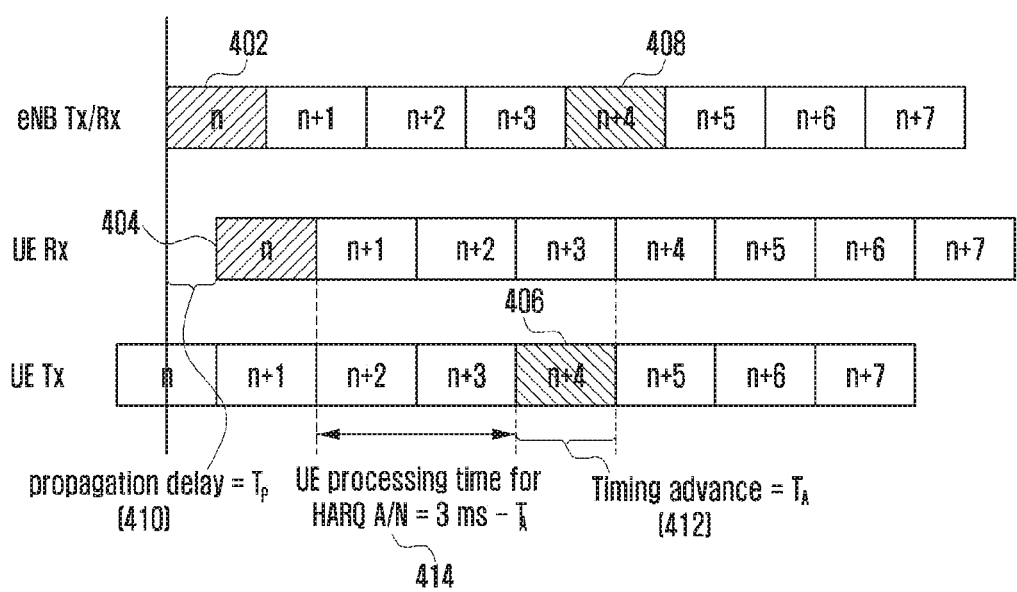
FIG. 4 is a diagram illustrating first and second signal transmission and reception timings of an eNB and a UE when TA is applied in an LTE or LTE-A under the assumption that a transmission delay is greater than 0.

FIG. 4 is a diagram illustrating transmission timings an eNB and a UE in an FDD LTE system in which the UE transmits UL data based on a UL grant received from the eNB and an HARQ ACK/NACK corresponding to the UL data especially when TA is applied.

If the eNB transmits a UL grant or a DL control signal and data to the UE at the $n^{th}$ subframe 402, the UE receives the UL grant or the DL control signal and data at the $n^{th}$ subframe 404. Here, the UE receives the signal transmitted by the eNB with a propagation delay $T_P$ 410. If the UE receives a UL grant at the $n^{th}$ subframe, it transmits uplink data at the $(n+4)^{th}$ subframe 406.

If the UE receives a DL control signal and data at the $n^{th}$ subframe by way of example, it transmits an HARQ ACK/NACK corresponding to the DL data at the $(n+4)^{th}$ subframe 406.

The UE also transmit the UL data or the HARQ ACK/NACK corresponding to the DL data at a timing as much as $T_A$ 412 earlier than the $(n+4)^{th}$ subframe in order for the UL data or the HARQ ACK/NACK to arrive at the eNB at a scheduled timing. In this case, a time period given for the UE to prepare UL data transmission scheduled via the UL grant or transmission of HARQ ACK/NACK corresponding to the DL data may be calculated by subtracting $T_A$ from 3 ms, corresponding to three subframes as denoted by reference number 414.

The time period of 3 ms–$T_A$ is designed for the legacy LTE and, if the TTI is shortened or the transmission timing is changed, it may be changed.

The eNB calculates an absolute value of the TA for the corresponding UE. According to an embodiment of the present invention, the eNB may calculate the absolute value of the TA by adding or subtracting to or from the TA value transmitted to the UE in the random access procedure.

In the present invention, the absolute value of the TA may be a value obtained by subtracting the starting time of the $n^{th}$ TTI for reception from the starting time of the $n^{th}$ TTI for transmission.

Meanwhile, one of the important criteria determining the throughput of a wireless cellular communication system is packet data latency. LTE employs a TTI of 1 ms, which is identical with the length of one subframe. An LTE system employing a TTI of 1 ms may support a UE operating with a TTI shorter than 1 ms (short-TTI UE). Meanwhile, the 5G NR may employ a TTI shorter than 1 ms. The short-TTI UE is suitable for latency-sensitive services such as voice over LTE (VoLTE) and remote control services and is expected to be a means for realizing mission-critical IoT. It may also be expected that the short-TTI UE can be a means for realizing cellular-based mission-critical IoT.

Figure 5:
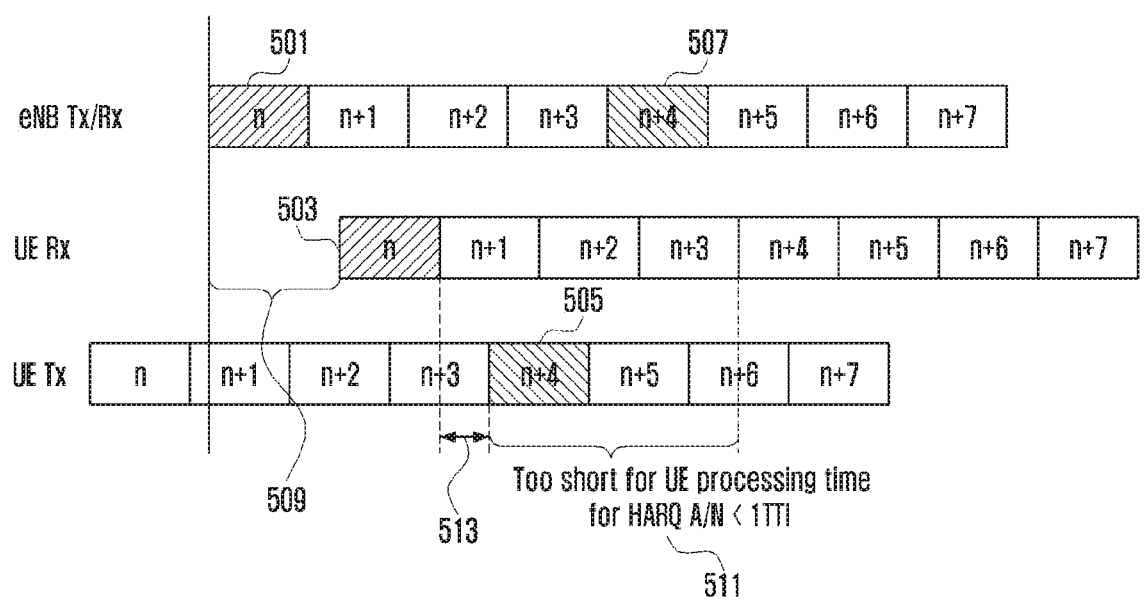
FIG. 5 is a diagram illustrating first and second signal transmission and reception timings of an eNB and a UE when TA is applied in an LTE or LTE-A under the assumption that a transmission delay is greater than 0.

The time period of 3 ms$-T_A$ that is given to the UE for preparing transmission as depicted in FIG. 4 may be changed as shown in FIG. 5 for the case of a short-TTI UE or UE with the large absolute value of $T_A$ as denoted by reference number 511.

For example, if a UL grant is transmitted at the $n^{th}$ TTI 501 and 503 and if the corresponding uplink data is transmitted at the $(n+4)^{th}$ TTI 505 and 507, the time period given for the UE to prepare the UL transmission becomes 3 TTIs$-T_A$ as denoted by reference number 513. If the TTI is shorter than 1 ms and if the distance between the UE and the eNB is so far that $T_A$ is large, the time period given for the UE to prepare the UL transmission may become a smaller and even negative number. There is therefore a need of a method for determining the timing for transmitting uplink data and HARQ ACK/NACK corresponding to downlink data appropriately to solve the aforementioned problem.

Exemplary embodiments of the present invention are described with reference to the accompanying drawings in detail. Detailed description of well-known functions and structures incorporated herein may be omitted to avoid obscuring the subject matter of the present invention. Further, the following terms are defined in consideration of the functionality in the present invention, and may vary according to the intention of a user or an operator, usage, etc. Therefore, the definition should be made on the basis of the overall content of the present specification. In the following description, the term "base station (BS)" denotes the entity for allocating resources to terminals and is intended to include at least one of a Node B, an evolved Node B (eNB), a radio access unit, a base station controller, and a network node. The term "terminal" is intended to include a user equipment (UE), a mobile station (MS), a cellular phone, a smartphone, a computer, and a multimedia system with a communication function. The term "downlink (DL)" denotes the radio transmission path from a base station to a terminal, and the terminal "uplink (UL)" denotes the radio transmission path from the terminal to the base station. Although the description is directed to an LTE or LTE-A system by way of example, the present invention is applicable to other communication systems having a similar technical background and channel format. For example, the present invention is applicable to the 5G mobile communication technology (5G new radio (NR)) under development after LTE-A. It will be understood by those skilled in the art that the present invention can be applied even to other communication systems with a slight modification without departing from the spirit and scope of the present invention.

Unless otherwise stated, the shortened-TTI UE and the normal-TTI UE are respectively referred to as first-type and second-type UEs. The first-type UE may be intended to include a UE that transmits any or both of control information and data during a TTI equal to or shorter than 1 ms, and the second-type UE may be intended to include a UE that transmits any or both of control information and data during a TTI of 1 ms.

In the following description, the terms "shortened-TTI UE" and "first-type UE" are interchangeably used, and the terms "normal-TTI UE" and "second-type UE" are interchangeably used. In the present invention, the terms "shortened-TTI", "shorter-TTI", "shortened TTI", "shorter TTI", "short TT", and "sTTI" are interchangeably used in the same meaning. In the present invention, the terms "normal-TTI", "normal TTI", "subframe TTI", and "legacy TTI" are interchangeably in the same meaning.

In the following description, the term "shortened-TTI transmission" may be interchangeably referred to as "first-type transmission", and the terminal "normal-TTI transmission" may be interchangeably referred to as "second-type transmission". The first-type transmission is a transmission scheme for transmitting any or both of the control and data signals during a period shorter than 1 ms, and the second-type transmission is a transmission scheme for transmitting any or both of the control and data signals during a period of 1 ms.

In the following description, the terms "shortened-TTI transmission" and "first-type transmission" are interchangeably used, and the terms "normal-TTI transmission" and "second-type transmission" are interchangeably used. The first-type UE may support both the first-type and second-type transmissions or only the first-type transmission. The second-type UE may support the second-type transmission but not the first-type transmission. In the present invention, the expression "for the first-type terminal" may be interpreted in the meaning of "for the first-type transmission" for convenience of explanation.

The first type transmission may be characterized in that the TTI length is equal to the normal-TTI but the uplink transmission timing upon after receipt of an uplink grant or the HARQ ACK/NACK transmission timing corresponding to a downlink data transmission is earlier than that in the case of the normal-TTI.

In the case of the FDD LTE system operating with 1 ms TTI, a HARQ ACK/NACK corresponding to the PDSCH transmitted at the $n^{th}$ subframe is transmitted on PUCCH or PUSCH in the $(n+4)^{th}$ subframe and this is the operation in the normal mode. However, although the 1 ms TTI is used for the first-type transmission, it may be considered that the HARQ ACK/NACK corresponding to the PDSCH transmitted at the $n^{th}$ subframe is transmitted on PUCCH or PUSCH in the $(n+2)^{th}$ or $(n+3)^{th}$ subframe, which may be called delay reduction mode. The delay reduction mode includes the shortened-TTI transmission mode. That is, the first-type transmission may indicate at least one of the shortened-TTI-based transmission mode and the transmission mode in which the HARQ ACK/NACK corresponding to the PDSCH transmitted at the $n^{th}$ subframe is transmitted on PUCCH or PUSCH in the $(n+2)^{th}$ or $(n+3)^{th}$ subframe, and the second-type transmission may indicate the transmission mode operating with the normal-TTI in which the HARQ ACK/NACK corresponding to the PDSCH transmitted at the $n^{th}$ subframe is transmitted on PUCCH or PUSCH in the $(n+4)^{th}$ subframe or later.

In the present invention, the TTI denotes a unit of time for transmitting control and data signals or only the data signal in downlink. In the legacy LTE system by way of example, the TTI is equal in length to one subframe as a unit of time, i.e., 1 ms, in downlink. In the present invention, the TTI may denote a unit of time for transmitting a control and data signal or only the data signal in uplink. In the legacy LTE system, the TTI is a time unit of 1 ms equal in length with one subframe in both downlink and uplink.

In the present invention, the term "shortened-TTI mode" denotes the operation mode in which the UE or the base station transmits/receives a control or data signal in unit of the shortened TTI, and the term "normal-TTI mode" denotes the operation mode in which the UE or the base station transmits/receives a control or data signal in unit of subframe.

In the present invention, the term "shortened-TTI data" denotes the data being transmitted/received on PDSCH or PUSCH in unit of the shortened TTI, and the term "normal-TTI data" denotes the data being transmitted/received on PDSCH or PUSCH in unit of subframe.

In the present invention, the term "control signal for shortened-TT" denotes the control signal for the shortened-TTI mode operation and is interchangeably referred to as sPDCCH, and the term "control signal for normal-TTI" denotes the control signal for the normal-TTI mode operation. Examples of the control signal for normal-TTI include PCFICH, PHICH, PDCCH, EPDCCH, and PUCCH for use in the legacy LTE system.

In the present invention, the terms "physical channel" and "signal" in use in the LTE or LTE-A may be interchangeably used with the terms "data" or "control signal". For example, PDSCH may be referred to as normal-TTI data, and the sPDSCH as a physical channel conveying shortened-TTI data may be referred to as shortened-TTI data in the present invention. Likewise, the shortened-TTI data being transmitted in downlink and uplink may be referred to as sPDSCH and sPUSCH, respectively in the present invention.

As described above, the present invention defines the transmission and reception operations of the shortened-TTI UE and base station and proposes a method for supporting legacy UE and shortened-TTI UE in the same system. In the present invention, the normal-TTI UE denotes the UE that transmits and receives control information and data information in unit of 1 ms or one subframe. The control information for the normal-TTI UE may be transmitted on a PDCCH mapped to up to 3 OFDM symbols in one subframe or on an EPDCCH mapped to specific resource blocks within one subframe. The shortened-TTI UE may performs transmission/reception in unit of subframe as the normal-TTI UE does or in unit of time shorter than one subframe. The shortened-TTI UE may be the UE supporting only transmission/reception in unit of time shorter than one subframe.

In the present invention, the uplink grant signal and the downlink data signal are referred to as first signal. In the present invention, the uplink data signal scheduled by the uplink grant and the HARQ ACK/NACK corresponding to a downlink data signal are referred to as second signal. In the present invention, if one of the signals being transmitted from the base station to the UE requires a response thereto, it may be the first signal, and the response of the UE to the first signal may be the second, signal.

In the present invention, the type of service for the first signal may fall on three categories: enhanced mobile broadband (eMBB), massive machine type communications (mMTC), and ultra-reliable and low-latency communications (URLLC).

In the present invention, the TTI length of the first signal denotes the time length for transmitting the first signal. In the present invention, the TTI length of the second signal denotes the time length for transmitting the second signal. In the present invention, the second signal transmission timing denotes the information indicating the timing at which the UE transmits the second signal and the base station receive the second signal and, it may be referred to as second signal transmission/reception timing.

In the present invention, assuming that the UE transmits the second signal at $(n+k)^{th}$ TTI when the base station transmits the first signal at the $n^{th}$ TTI, if the base station notifies the UE of the second signal transmission timing, this may mean that the base station notifies the UE of the value of k. Assuming that the UE transmits the second signal at the $(n+k+a)^{th}$ TTI when the base station transmits the first signal at the $n^{th}$ TTI, if the base station notifies the UE of the second signal transmission timing, this may mean that the base station notifies the UE of the offset value of a. The value of n+4+a may be substituted by n+3+a, n+5+a, or the like to indicate the offset in the present invention.

Although the description is directed to a method for determining signal transmission and reception timings between the base station and the UE, the method may be used as a method for determining signal transmission and reception timings between two UEs.

Unless the TDD system is specified, the description is made under the assumption of the FDD system. However, the method and apparatus proposed in the present invention for use in the FDD system is applicable to the TTD system with slight modifications.

In the present invention, the term "higher layer signaling" denotes a signaling method for the base station to transmit a signal to the UE on a downlink data channel of the physical layer or for the UE to transmit a signal to the base station on an uplink data channel of the physical layer and may be referred to as RRC signaling or MAC control element (CE) signaling.

First Embodiment

The first embodiment is directed to a method for a terminal to determine a second signal transmission timing based on a TTI length, the method being described with reference to FIGS. 6 and 7.

Figure 6:
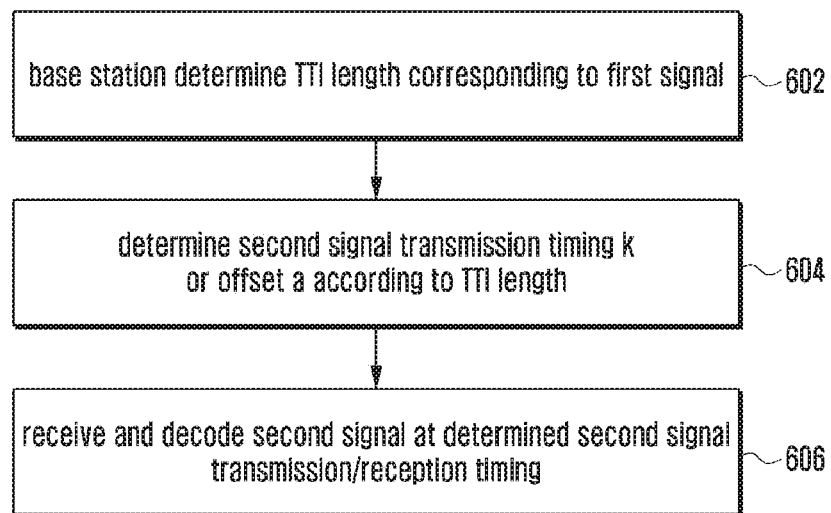
FIG. 6 is a flowchart illustrating a base station procedure according to the first embodiment of the present invention.
Figure 7:
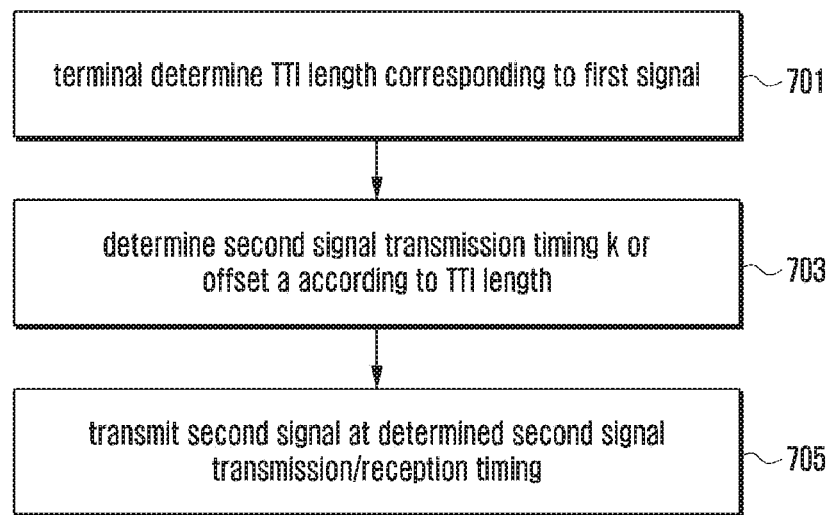
FIG. 7 is a flowchart illustrating a terminal procedure according to the first embodiment of the present invention.

FIGS. 6 and 7 are flowchart illustrating operations of a base station and a terminal according to this embodiment.

If the terminal receives the first signal from the base station at the $n^{th}$ TTI, it may transmit the second signal to the base station at the $(n+k)^{th}$ TTI at step 705. The terminal may determine k, at step 703, based on the TTI length used in receiving the first signal.

The base station may determine the value of k according to the TTI length at step 604 and receive the second signal at the timing determined based on the value of k at step 606. That is, the base station may receive the second signal at the $(n+k)^{th}$ TTI.

According to this embodiment of the present invention, if the TTI length used in receiving the first signal is one subframe or 1 ms, k may become 4. As another example, if the TTI length used in receiving the first signal is one slot or 0.5 ms, k may become 0; if the TTI length used in receiving the first signal is 0.2 ms, k may become 6; if the TTI length used in receiving the first signal is 2 LTE OFDM symbols, k may become 7. Although the TTI length used in receiving the first signal determines the value of k by way of example, it is obvious that the value of k may also be determined based on another parameter. Meanwhile, the TTI length used in receiving the first signal may determine an offset value, according to a rule, rather than the second signal transmission/reception timing. If the terminal receives the first signal at the $n^{th}$ TTI, it may transmit the second signal to the base station at the $(n+4+a)^{th}$ TTI. Here, the value of a is determined according to the TTI length used in received the first signal.

For example, if the TTI length used in receiving the first signal is one subframe or 1 ms, a may become 0. As another example, if the TTI length used in receiving the first signal is one slot or 0.5 ms, a may become 1. If the TTI length used in receiving the first signal is 0.2 ms, a may become 2; if the TTI length used in receiving the first signal is 2 LTE OFDM symbols, a may become 3. Although the TTI length used in receiving the first signal determines a by way of example, it is obvious that a may also be determined another parameter.

If the value of k or the offset value of a is determined as above and transmitted to the terminal, the terminal may transmit the second signal to the base station at the $(n+k)^{th}$ TTI or $(n+4+a)^{th}$ TTI. Alternatively, the terminal may transmit the second signal at the $(n+1)^{th}$ TTI or a TTI available among the TTIs following the $(n+k)^{th}$ TTI.

It may also be possible for the terminal to transmit the second signal at the $(n+4+a)^{th}$ TTI or a TTI available among the TTIs following the $(n+4+a)^{th}$ TTI. The TTI available for transmission may be a TTI that the terminal determines for uplink transmission.

Second Embodiment

The second embodiment is directed to a method for a base station to configure a second signal transmission timing to a terminal via higher layer signal, the method being described with reference to FIGS. 8 and 9.

Figure 8:
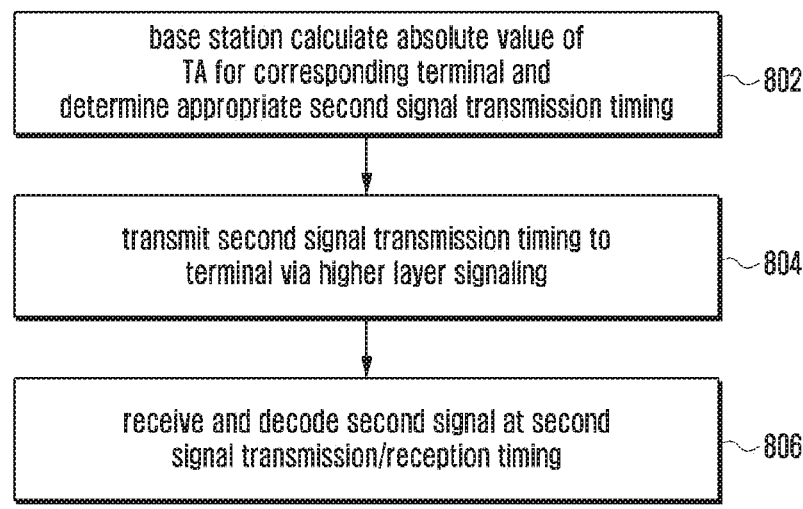
FIG. 8 is a flowchart illustrating a base station procedure according to the second embodiment of the present invention.
Figure 9:
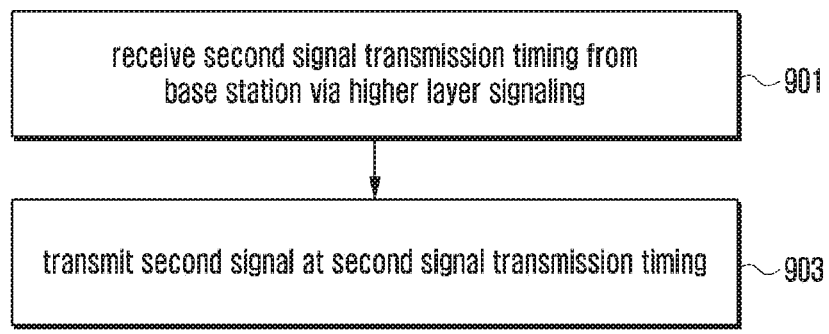
FIG. 9 is a flowchart illustrating a base terminal procedure according to the second embodiment of the present invention.

FIGS. 8 and 9 are flowchart illustrating operations of a base station and a terminal according to this embodiment.

The base station may calculate an absolute value of TA for the terminal at step 802. According to this embodiment, the base station calculate the absolute value of the TA by adding or subtracting to or from an initial TA value transmitted to the terminal in the random access procedure and, since the random access, a change amount of the TA transmitted via higher layer signaling. The base station may determine, at step 802, the value of k or the offset value of a for use in determining the second signal transmission timing based on the TTI length used in transmitting the first signal and the absolute value of TA for the corresponding terminal and transmit, at step 804, the value of k or the offset value of a to the terminal via higher layer signaling. Afterward, the base station may receive and decode, at step 806, the second signal at the corresponding timing.

As described above, that the terminal transmits the second signal at $(n+k)^{th}$ TTI when the base station transmits the first signal at the $n^{th}$ TTI, if the base station notifies the terminal of the second signal transmission timing, this may mean that the base station notifies the terminal of value of k. Assuming that the terminal transmits the second signal at the $(n+k+a)^{th}$ TTI when the base station transmits the first signal at the $n^{th}$ TTI, if the base station notifies the terminal of the second signal transmission timing, this may mean that the base station notifies the terminal of the offset value of a. It is obvious that the value of n+4+a may be substituted by n+3+a, n+5+a, or the like.

The terminal may receive, at step 901, the value of k or the offset value of a for use in determining the second signal transmission timing from the base station. Afterward, if the terminal receive the first signal at the $n^{th}$ TTI, it transmits, at step 903, the second signal at the $(n+k)^{th}$ TTI or $(n+4+a)^{th}$ TTI to the base station.

The base station may determine the value of k or the offset value of a for use in determining the second signal transmission timing in consideration of terminal capability which the terminal report to the base station.

Instead of transmitting a single value of k or a, it may be possible to transmit a set of values of k or offset values of a via higher layer signaling. The terminal may determine the second signal transmission timing based on a value selected from the set of values of k or offset values of a. According to an embodiment of the present invention, the terminal may select a value from the set of the values of k or offset values of a based on a specific bit of the DCI being transmitted by the base station along with the first signal or arbitrarily.

Although the description is directed to the case where the second signal transmission timing is determined based on the absolute value of the TA, it may also be possible to determine the timing regardless of the absolute of the TA.

Third Embodiment

The third embodiment is directed to a method for a base station to configure a second signal transmission timing to a terminal via downlink control information (DCI), the method being described with reference to FIGS. 10 and 11.

Figure 10:
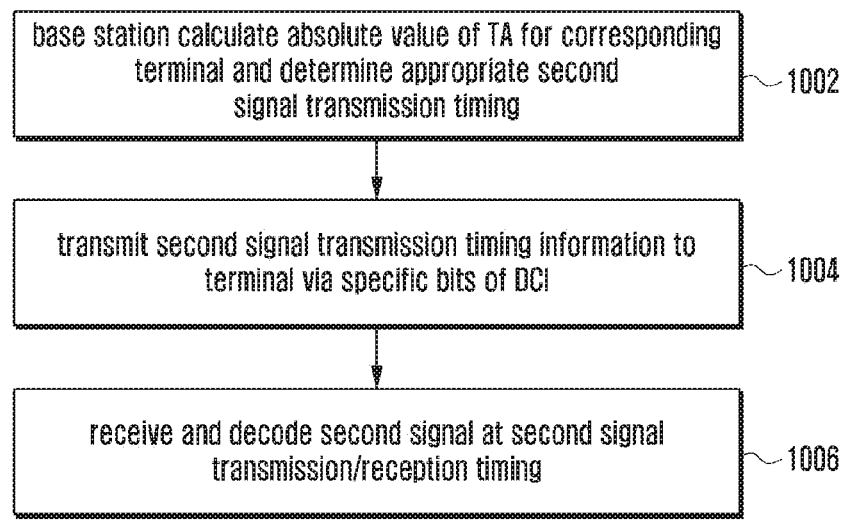
FIG. 10 is a flowchart illustrating a base station procedure according to the third embodiment of the present invention.
Figure 11:
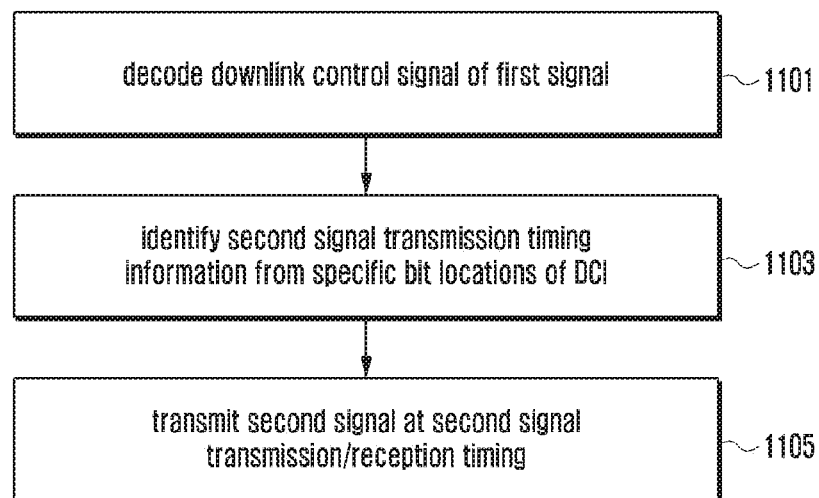
FIG. 11 is a flowchart illustrating a terminal procedure according to the third embodiment of the present invention.

FIGS. 10 and 11 are flowcharts illustrating operations of a base station and a terminal according to this embodiment.

The base station may calculate an absolute value of TA for the terminal at step 1002. According to this embodiment, the base station calculate the absolute value of the TA by adding or subtracting to or from an initial TA value transmitted to the terminal in the random access procedure and, since the random access, a change amount of the TA transmitted via higher layer signaling. The base station may configure, at step 1002, the second signal transmission timing of the terminal based on the TTI length to be used in transmitting the first signal and the absolute value of the TA for the corresponding terminal.

The base station may transmit, at step 1004, the determined timing information to the terminal using predetermined x bits of the DCI being transmitted along with the first signal. Here, x may be 1, 2, or 3.

The base station may receive and decode, at step 1006, the second signal transmitted at the second signal transmission timing.

The terminal may decode the downlink control signal at step 1101 and checks the predetermined x bits of the DCI to ascertain the value of k or the offset value of a for use in determining the second signal transmission timing from the predetermined x bits at step 1103.

Afterward, if the terminal receives the first signal at the $n^{th}$ TTI, it may transmit, at step 1105, the second signal at the $(n+k)^{th}$ TTI or $(n+4+a)^{th}$ TTI.

If x is 2 by way of example, i.e., if 2 bits of the DCI is used for indicating the second signal transmission timing, the 2 bits may be set to indicate the value of k as shown in Table 2.

TABLE 2

| HARQ timing bits | k |
| --- | --- |
| 00 | 4 |
| 01 | 5 |
| 10 | 6 |
| 11 | 7 |

According to an embodiment of the present invention, the offset value for use in determining the second signal transmission timing may be indicated as shown in Table 3.

TABLE 3

| HARQ timing bits | a |
| --- | --- |
| 00 | −1 |
| 01 | 0 |
| 10 | 1 |
| 11 | 2 |

According to an embodiment of the present invention, the base station may determine the value of k or the offset value of a for use in determining the second signal transmission timing in consideration of the terminal capability which the terminal reports to the base station.

According to an embodiment of the present invention, the base station may notify the terminal of a mapping between the values of x bits of the DCI of the downlink control signal and the second signal transmission timing via higher layer signaling.

Although the description is directed to the case where the base station determines the second signal transmission timing based on the absolute value of TA, it may also be possible to determine the timing regardless of the absolute of the TA.

Fourth Embodiment

The fourth embodiment is directed to a method for a base station and a terminal to determine a second signal transmission timing of the terminal based on the absolute value of TA, the method being described with reference to FIGS. 12 and 13.

Figure 12:
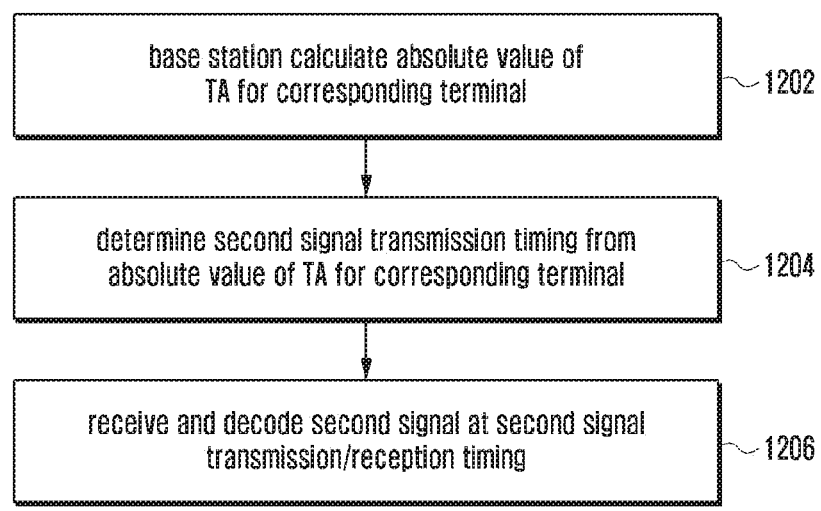
FIG. 12 is a flowchart illustrating a base station procedure according to the fourth embodiment of the present invention.
Figure 13:
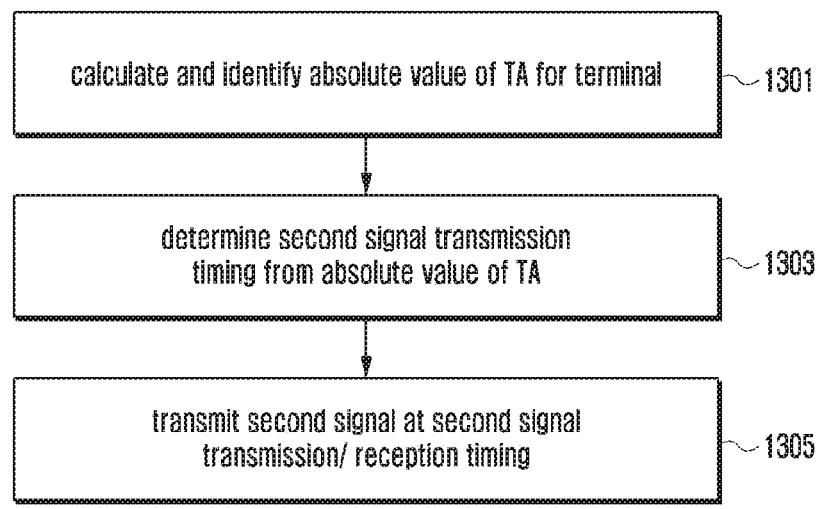
FIG. 13 is a flowchart illustrating a terminal procedure according to the fourth embodiment of the present invention.

FIGS. 12 and 13 are flowcharts illustrating operations of a base station and a terminal according to this embodiment.

The base station may calculate an absolute value of TA for the terminal at step 1202. According to this embodiment, the base station calculate the absolute value of the TA by adding or subtracting to or from an initial TA value transmitted to the terminal in the random access procedure and, since the random access, a change amount of the TA transmitted via higher layer signaling.

The terminal may also calculate, at step 1301, the absolute value of TA in the same manner as the base station does. The terminal may calculate the absolute value of TA by subtracting the start time of the $n^{th}$ TTI for reception from the start time of the $n^{th}$ TTI for transmission. In the present invention, the absolute value of TA may be referred to as $N_{TA}$.

The base station and the terminal may calculate $N_{TA}$ as described above and map $N_{TA}$ to the second signal transmission timing according to a predetermined mapping rule. The base station and the terminal may ascertain, at steps 1204 and 1303, the second signal transmission timing from $N_{TA}$ based on the mapping relationship, the terminal transmits, at step 1305, the second signal at the second signal transmission timing, and the base station may receive and decode, at step 1206, the second signal transmitted by the terminal.

Assuming the TTI length of 0.5 ms by way of example, it may be possible to ascertain the value of k for use in determining the second signal transmission timing from $N_{TA}$, by referencing Table 4.

TABLE 4

| $N_{TA}$ | k |
|---|---|
| $N_{TA} > 320$ | 5 |
| $N_{TA} \leq 320$ | 4 |

It may also be possible to determine the value of k by further taking the TTI length into consideration as shown in Table 5.

TABLE 5

| TTI length | $N_{TA}$ | k |
|---|---|---|
| 0.25 ms | $N_{TA} > 320$ | 5 |
| | $64 < N_{TA} \leq 320$ | 4 |
| | $N_{TA} \leq 64$ | 3 |
| 0.2 ms | $N_{TA} > 320$ | 7 |
| | $64 < N_{TA} \leq 320$ | 5 |
| | $N_{TA} \leq 64$ | 4 |
| 0.14 ms | $N_{TA} > 640$ | 9 |
| | $320 < N_{TA} \leq 640$ | 6 |
| | $64 < N_{TA} \leq 320$ | 5 |
| | $N_{TA} \leq 64$ | 4 |

In the above table, the sign of equality may be removed from an equal and inequality sign or added to an inequality sign, and the TTI length, $N_{TA}$, and k may be mapped in various manners. It is obvious that the offset value of a is used instead of the value of k for determining the second signal transmission timing. It may also be possible that an absolute time length is used instead of $N_{TA}$. It may also be possible to change the value of k or a according to the change amount of TA during a predetermined time period instead of the use of $N_{TA}$ with slight modifications of the present invention.

Fifth Embodiment

The fifth embodiment is directed to a method for the base station to determine a second signal transmission timing of the terminal based on the processing capability of the terminal or terminal capability and notify the terminal of the second signal transmission timing, the method being described with reference to FIGS. 14 and 15.

Figure 14:
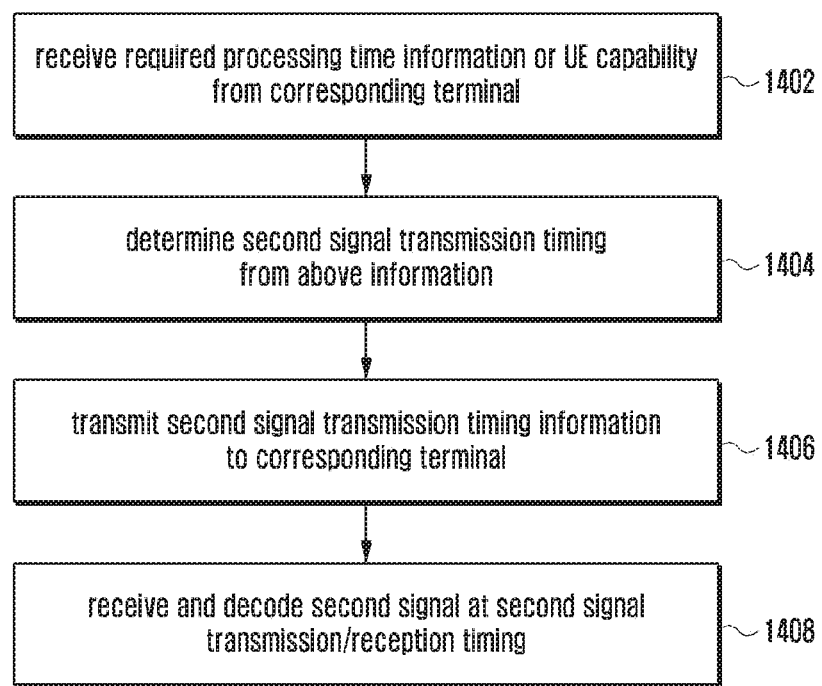
FIG. 14 is a flowchart illustrating a base station procedure according to the fifth embodiment of the present invention.
Figure 15:
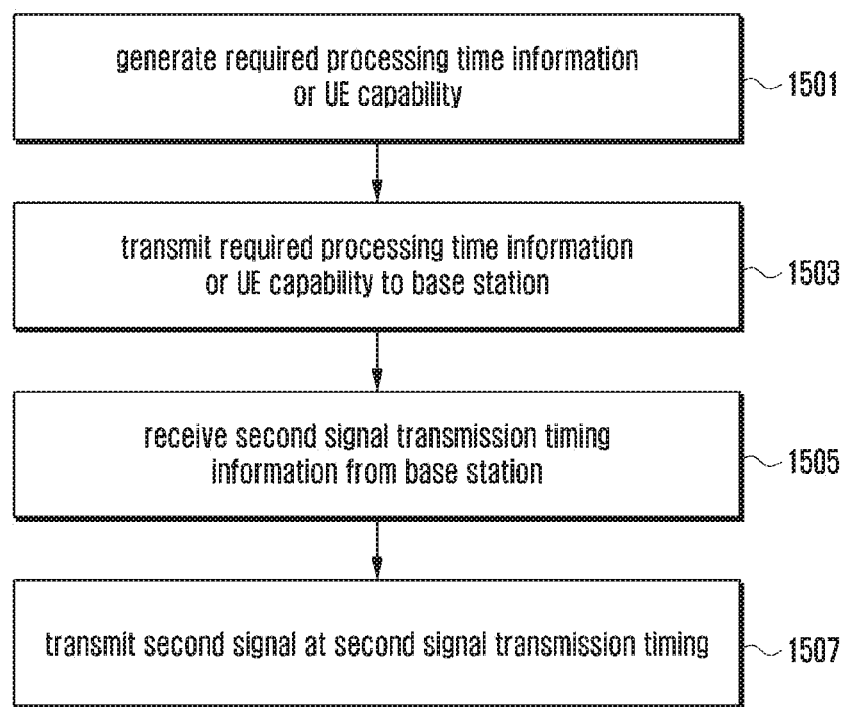
FIG. 15 is a flowchart illustrating a terminal procedure according to the fifth embodiment of the present invention.

FIGS. 14 and 15 are flowchart illustrating operations of a base station and a terminal according to this embodiment.

The terminal may generate, at step 1501, information on a processing time necessary for processing the first signal and transmitting the second signal based on the TTI length used in the initial access.

The terminal may transmit, at step 1503, the processing time information to the base station. According to an embodiment of the present invention, the processing time information may be transmitted to the base station as a kind of terminal capability (UE capability). The processing time information may be transmitted to the base station via physical layer signaling or channel or higher layer signaling.

The terminal may receive, at step 1505, the second signal transmission timing information from the base station using one of the methods described in the first, second, and third embodiments.

The terminal may transmit, at step 1507, the second signal at the second signal transmission timing determined by one of the methods described in the first, second, and third embodiments. According to an embodiment of the present invention, step 1505 for the terminal to receive the second signal transmission timing information from the base station may be omitted.

The base station may receive, at step 1402, the terminal capability or processing time information from the terminal and determine, at step 1404, the second signal transmission timing of the corresponding terminal appropriately.

Next, the base station may transmit, at step 1406, the second signal transmission timing information to the terminal using one of the methods described in the first, second, and third embodiments and receive, at step 1408, the second signal in adaptation to the second signal transmission timing in one of the methods described in the first, second, and third embodiments.

In this embodiment, step 1406 for the base station to transmit the second signal transmission timing information to the terminal may be omitted.

Sixth Embodiment

The sixth embodiment is directed to a method for determining the second signal transmission timing based on the type of service associated with the first signal, the method being described with reference to FIGS. 16 and 17.

Figure 16:
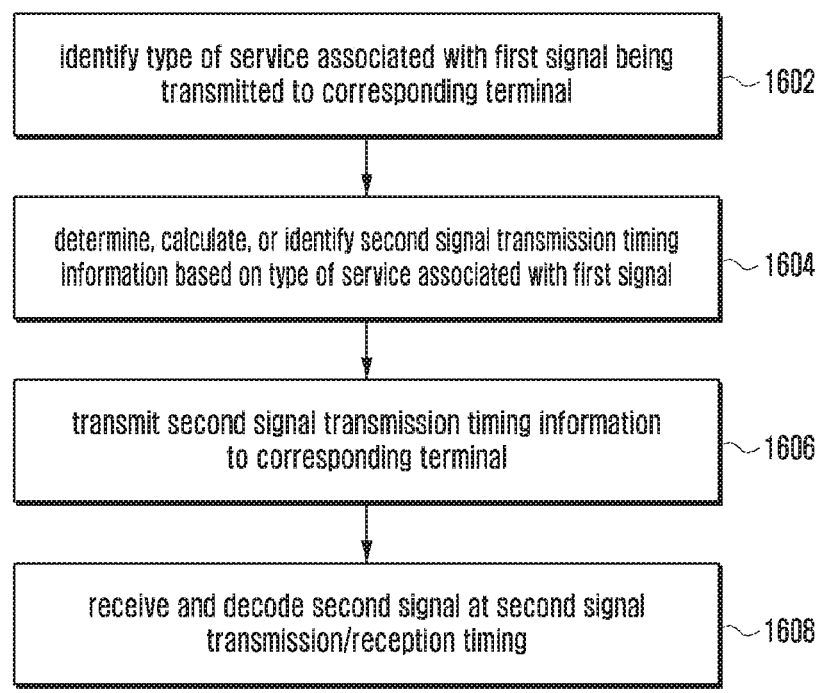
FIG. 16 is a flowchart illustrating a base station procedure according to the sixth embodiment of the present invention.
Figure 17:
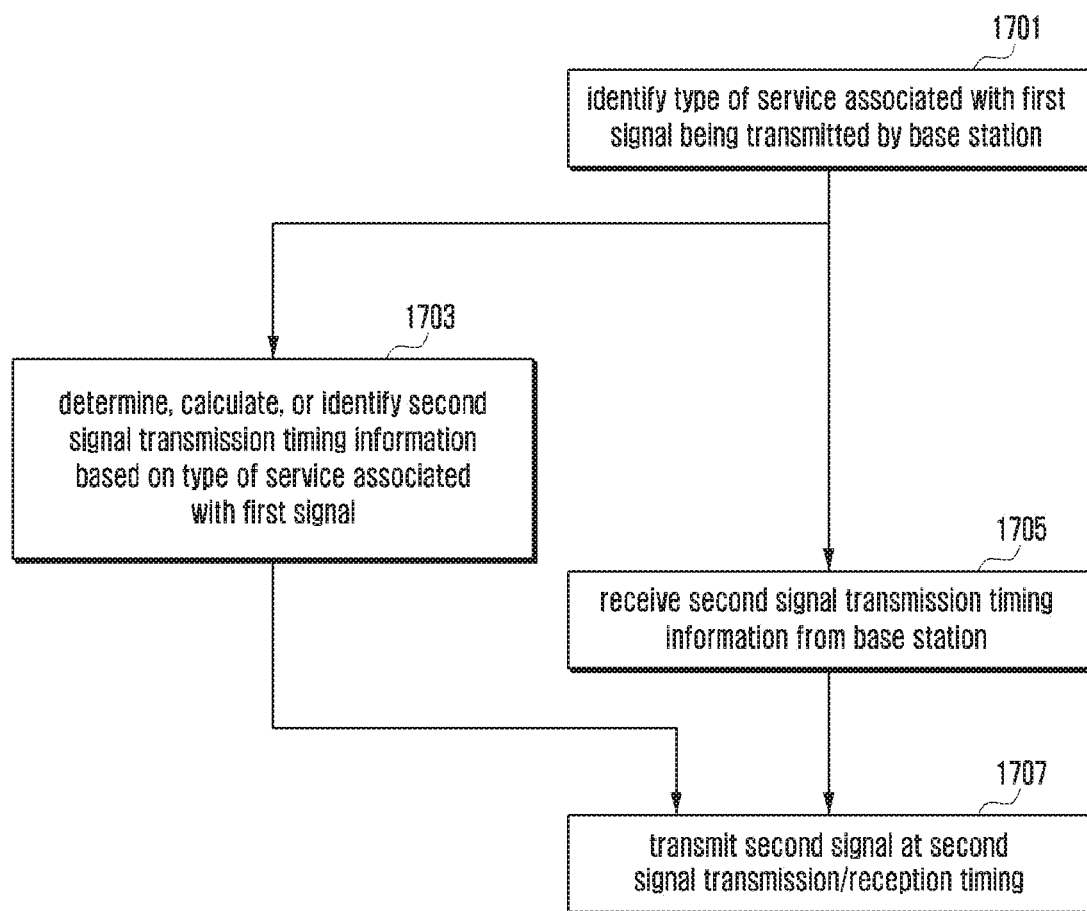
FIG. 17 is a flowchart illustrating a terminal procedure according to the sixth embodiment of the present invention.

FIGS. 16 and 17 are flowcharts illustrating operations of a base station and a terminal according to this embodiment.

The base station may determine, at step 1602, the type of the service associated with the first signal. According to an embodiment of the present invention, the base station may determine whether the first signal is associated with an eMBB service requiring a high data rate transmission, a mMTC service requiring low data and rate low cost transmission, or a URLLC service requiring a low latency and high reliability transmission.

The base station may determine, at step 1604, the second signal transmission timing based on the type of service. According to an embodiment of the present invention, the second signal transmission timing may be predetermined per service at step 1604.

The base station may transmit, at step 1606, the second signal transmission timing information to the terminal using one of the methods described in the first, second, and third embodiments, and receive, at step 1608, the second signal in adaptation to the second signal transmission timing in one of the methods described in the first, second, and third embodiments. According to an embodiment of the present invention, step 1606 for the base station to transmit the second signal transmission timing information to the terminal may be omitted.

The terminal may determine, at step 1701, the type of the service associated with the first signal. According to an embodiment of the present invention, the terminal may determine, at step 1701, whether the first signal is associated with an eMBB service requiring a high data rate transmission, a mMTC service requiring low data and rate low cost transmission, or a URLLC service requiring a low latency and high reliability transmission.

The terminal may determine, at step 1703, the second signal transmission timing according to the type of the service. The terminal may receive, at step 1705, the second signal transmission timing information from the base station in one of the methods described in the first, second, and third embodiments.

Afterward, the terminal may transmit, at step 1707, the second signal at the second signal transmission timing in one of the methods described in the first, second, and third embodiments.

Seventh Embodiment

The seventh embodiment is directed to a method for a first-type terminal to transmit a second signal for normal-TTI and a second signal for short-TTI simultaneously.

In this embodiment, if the first-type terminal simultaneously receives first signals triggering transmissions of the second signals for normal-TTI and short-TTI, respectively, from the base station, it may opt to transmit the first signal corresponding to one of the second signals for normal-TTI and short-TTI. This determination may be made in such a way of transmitting the second signal corresponding to the first signal that is received most lately.

According to another embodiment of the present invention, when the first signals triggering simultaneous transmissions of the second signals for normal-TTI and short-TTI, the terminal may transmit the second signal corresponding to the first signal for short-TTI.

It may also be possible for the terminal to transmit the second signal corresponding to the first signal for short-TTI when it receives the first signals triggering simultaneous transmissions of the second signals for normal-TTI and short-TTI.

It may also be possible for the first-type terminal to transmit the second signal corresponding to the first signal for short-TTI when it receives the first signals triggering simultaneous transmissions of the second signals for normal-TTI and short-TTI.

When the base station transmits to the first-type terminal the first signals triggering simultaneous transmissions of the second signals for normal-TTI and short-TTI, it may determine whether to receive the second signal for normal-TTI or short-TTI and receive the corresponding second signal. This determination may be made in such a way of transmitting the second signal corresponding to the first signal that is transmitted most lately.

When the base station transmits the first signals triggering simultaneous transmissions of the second signals for normal-TTI and short-TTI to the terminal, it may determine to receive the second signal corresponding to the first signal for short-TTI.

When the base station transmits the first signals triggering simultaneous transmissions of the second signals for normal-TTI and short-TTI to the terminal, it may determine to receive the second signal for shot-TTI.

Figure 18:
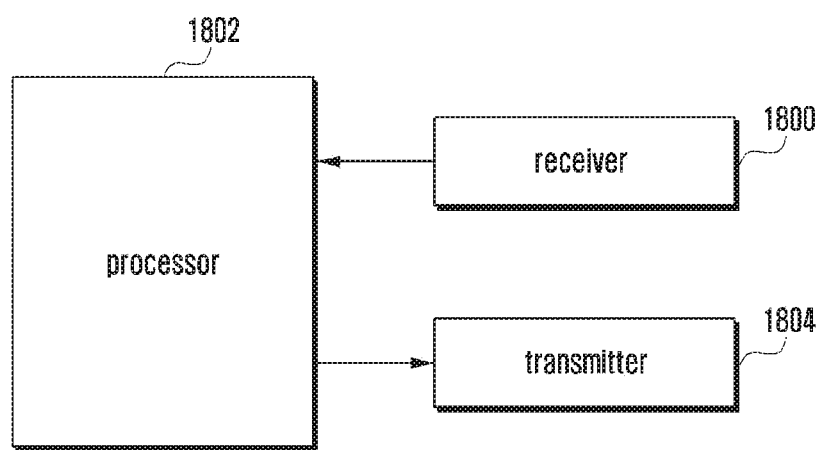
FIG. 18 is a block diagram illustrating a configuration of a terminal according to an embodiment of the present invention.
Figure 19:
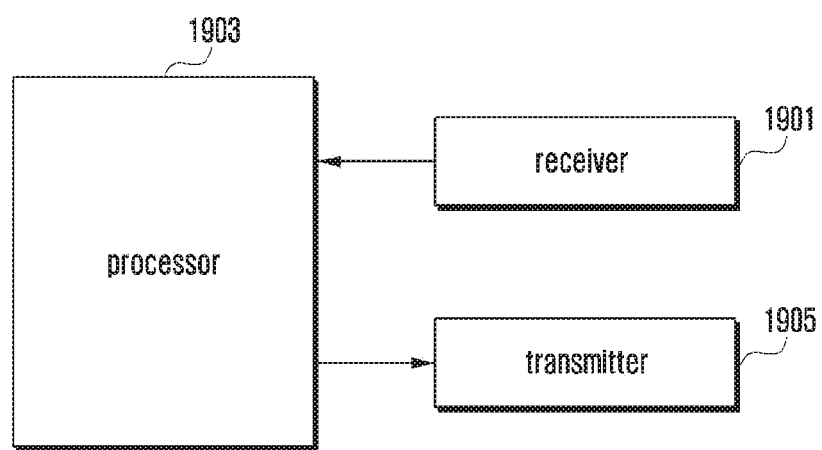
FIG. 19 is a block diagram illustrating a configuration of a base station according to an embodiment of the present invention.

The terminal and base station composed, each, of a transmitter, a receiver, and a processor for implementing the methods of the above embodiments are depicted in FIGS. 18 and 19, respectively.

In order to support the methods for determining the second signal transmission and reception timings and transmitting and receiving signals in accordance with the determined timings between the terminal and the base station as described in the first to sixth embodiments, the transmitter, receiver, and processor of each of the base station and the terminal should operate according to each embodiment.

FIG. 18 is a block diagram illustrating a configuration of a terminal according to an embodiment of the present invention. As shown in FIG. 18, the terminal may include a receiver 1800, a transmitter 1804, and a processor 1802. The receiver 1800 and the transmitter 1804 may be collectively referred to as transceiver. The transceiver may transmit and receive signals to and from a base station. The signals may include control information and data. The transceiver may include a radio frequency (RF) transmitter for frequency-up-converting and amplifying a signal to be transmitted and an RF receiver for low-noise-amplifying and frequency-down-converting a received signal.

The transceiver may output the signal received over a radio channel to the processor 1802 and transmit the signal output from the processor 1802 over the radio channel. The processor 1802 may control the overall operations of the terminal. For example, the processor 1802 may control the receiver 1800 to receive a signal including second signal transmission timing information from a base station and it may interprets the second signal transmission timing. The transmitter 1804 may transmit the second signal at the second signal transmission timing.

FIG. 19 is a block diagram illustrating a configuration of a base station according to an embodiment of the present invention. As shown in FIG. 19, the base station may include a receiver 1901, a transmitter 1905, and a processor 1903. According to an embodiment of the present invention, the receiver 1901 and the transmitter 1905 may be collectively referred to as a transceiver. The transceiver may transmit and receive signals to and from a terminal. The transceiver may include an RF transmitter for frequency-up-converting and amplifying a signal to be transmitted and an RF receiver for low-noise-amplifying and frequency-down-converting a received signal.

The transceiver may output the signal received over a radio channel to the processor 1903 and transmit the signal output from the processor 1903 over the radio channel. The processor 1903 may control the overall operations of the base station. For example, the processor 1903 may control to determine a second signal transmission timing and generate second signal transmission timing information. Next, the transmitter transmits the timing information to the terminal, and the receiver 1901 receive the second signal at the timing.

According to an embodiment of the present invention, the processor may control to generate downlink control information (DCI) including the second signal transmission timing information. In this case, the DCI may indicate inclusion of the second signal transmission timing.

Although preferred embodiments of the invention have been described using specific terms, the specification and drawings are to be regarded in an illustrative rather than a restrictive sense in order to help understand the present invention. It is obvious to those skilled in the art that various modifications and changes can be made thereto without departing from the broader spirit and scope of the invention. For example, embodiments 1 and 2 of the present invention and part of embodiment 5 may be combined to form an embodiment for the operations of a base station and a terminal. Although the embodiments are directed to a TDD LTE system or a 5G or NR system, it may be possible to apply them to other systems such as a 5G NR system to form other alternative embodiments without departing from the spirit and scope of the present invention.

As described above, the uplink grant signal and downlink data signal are referred to as first signal while the uplink data signal scheduled by the uplink grant and the HARQ ACK/NACK corresponding to a downlink data signal are referred to as second signal, in the present invention. However, the types of the first and second signals are used to help explain and understand the present invention rather than to limit the scope of the present invention. Accordingly, it is obvious to those in the art that the present invention can be practiced with other signals corresponding to the first and second signals that have a similar technical background.

What is claimed is:

1. A method performed by a base station in a wireless communication system, the method comprising:
   transmitting, to a terminal, a radio resource control (RRC) message including a set of values for a timing between a physical downlink shared channel (PDSCH) and acknowledgement information, wherein each value in the set of values corresponds to a respective number of a transmission time interval (TTI) between the PDSCH and the acknowledgement information;
   transmitting, to the terminal, first downlink control information (DCI) for a first PDSCH, wherein the first DCI includes a number of bits associated with a single value in the set of values;
   transmitting, to the terminal, the first PDSCH; and
   receiving, from the terminal, acknowledgement information for the first PDSCH, based on a transmission timing corresponding to a transmission timing of the first PDSCH and the single value associated with the number of bits in the first DCI.

2. The method of claim 1, wherein a size of the number of bits is based on a number of the values corresponding to the set of values.

3. The method of claim 1, wherein the number of bits is one of 1, 2 or 3.

4. The method of claim 1, further comprising:
   transmitting, to the terminal, second DCI for a second PDSCH, in case that a single value for the timing between the PDSCH and the acknowledgement information is included in the set of values; and
   receiving, from the terminal, acknowledgement information for the second PDSCH based on a transmission timing corresponding to a transmission timing of the second PDSCH and the single value.

5. The method of claim 1, further comprising:
   receiving, from the terminal, capability information associated with the transmission timing.

6. A method performed by a terminal in a wireless communication system, the method comprising:
   receiving, from a base station, a radio resource control (RRC) message including a set of values for a timing between a physical downlink shared channel (PDSCH) and acknowledgement information, wherein each value in the set of values corresponds to a respective number of a transmission time interval (TTI) between the PDSCH and the acknowledgement information;
   receiving, from the base station, first downlink control information (DCI) for a first PDSCH, wherein the first DCI includes a number of bits associated with a single value in the set of values;
   receiving, from the base station, the first PDSCH; and
   transmitting, to the base station, acknowledgement information for the first PDSCH, based on a transmission timing determined by using a reception timing of the first PDSCH and the single value associated with the number of bits in the first DCI.

7. The method of claim 6, wherein a size of the number of bits is based on a number of the values corresponding to the set of values.

8. The method of claim 6, wherein the number of bits is one of 1, 2 or 3.

9. The method of claim 6, further comprising:
   receiving, from the base station, second DCI for a second PDSCH, in case that a single value for the timing between the PDSCH and the acknowledgement information is included in the set of values; and
   transmitting, to the base station, acknowledgement information for the second PDSCH based on a transmission timing determined based on a transmission timing of the second PDSCH and the single value.

10. The method of claim 6, further comprising:
    transmitting, to the base station, capability information associated with the transmission timing.

11. A base station in a wireless communication system, the base station comprising:
a transceiver; and
a controller coupled with the transceiver and configured to:
transmit, to a terminal, a radio resource control (RRC) message including a set of values for a timing between a physical downlink shared channel (PDSCH) and acknowledgement information, wherein each value in the set of values corresponds to a respective number of a transmission time interval (TTI) between the PDSCH and the acknowledgement information;
transmit, to the terminal, first downlink control information (DCI) for a first PDSCH, wherein the first DCI includes a number of bits associated with a single value in the set of values;
transmit, to the terminal, the first PDSCH; and
receive, from the terminal, acknowledgement information for the first PDSCH, based on a transmission timing corresponding to a transmission timing of the first PDSCH and the single value associated with the number of bits in the first DCI.

12. The base station of claim 11, wherein a size of the number of bits is based on a number of the values corresponding to the set of values.

13. The base station of claim 11, wherein the number of bits is one of 1, 2 or 3.

14. The base station of claim 11, wherein the controller is further configured to:
transmit, to the terminal, second DCI for a second PDSCH, in case that a single value for the timing between the PDSCH and the acknowledgement information is included in the set of values; and
receive, from the terminal, acknowledgement information for the second PDSCH based on a transmission timing corresponding to a transmission timing of the second PDSCH and the single value.

15. The base station of claim 11, wherein the controller is further configured to receive, from the terminal, capability information associated with the transmission timing.

16. A terminal in a wireless communication system, the terminal comprising:
a transceiver; and
a controller coupled with the transceiver and configured to:
receive, from a base station, a radio resource control (RRC) message including a set of values for a timing between a physical downlink shared channel (PDSCH) and acknowledgement information, wherein each value in the set of values corresponds to a respective number of a transmission time interval (TTI) between the PDSCH and the acknowledgement information;
receive, from the base station, first downlink control information (DCI) for a first PDSCH, wherein the first DCI includes a number of bits associated with a single value in the set of values;
receive, from the base station, the first PDSCH; and
transmit, to the base station, acknowledgement information for the first PDSCH, based on a transmission timing determined by using a reception timing of the first PDSCH and the single value associated with the number of bits in the first DCI.

17. The terminal of claim 16, wherein a size of the number of bits is based on a number of the values corresponding to the set of values.

18. The terminal of claim 16, wherein the number of bits is one of 1, 2 or 3.

19. The terminal of claim 16, wherein the controller is further configured to:
receive, from the base station, second DCI for a second PDSCH, in case that a single value for the timing between the PDSCH and the acknowledgement information is included in the set of values;
transmit, to the base station, acknowledgement information for the second PDSCH based on a transmission timing determined based on a transmission timing of the second PDSCH and the single value.

20. The terminal of claim 16, wherein the controller is further configured to transmit, to the base station, capability information associated with the transmission timing.

* * * * *